United States Patent
Klatt et al.

(10) Patent No.: US 9,344,959 B2
(45) Date of Patent: May 17, 2016

(54) METHOD AND PROGRAM FOR ENHANCED PLMN SELECTION IN A PUBLIC LAND MOBILE NETWORK

(75) Inventors: Axel Klatt, Cologne (DE); Harald Schmitt, Bendorf (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 13/880,380

(22) PCT Filed: Oct. 24, 2011

(86) PCT No.: PCT/EP2011/005342
§ 371 (c)(1),
(2), (4) Date: Apr. 19, 2013

(87) PCT Pub. No.: WO2012/055523
PCT Pub. Date: May 3, 2012

(65) Prior Publication Data
US 2013/0217391 A1    Aug. 22, 2013

Related U.S. Application Data

(60) Provisional application No. 61/407,481, filed on Oct. 28, 2010.

(30) Foreign Application Priority Data

Oct. 28, 2010  (EP) .................................. 10014051

(51) Int. Cl.
*H04W 48/18* (2009.01)
*H04W 8/24* (2009.01)
(Continued)

(52) U.S. Cl.
CPC ................ *H04W 48/18* (2013.01); *H04W 8/24* (2013.01); *H04W 8/18* (2013.01); *H04W 60/04* (2013.01)

(58) Field of Classification Search
CPC ........ H04W 48/18; H04W 48/20; H04W 4/00
USPC ........ 455/435.2, 432.1, 433, 552.1, 436–444; 370/331, 332, 338
See application file for complete search history.

(56) References Cited

U.S. PATENT DOCUMENTS

| | | | |
|---|---|---|---|
| 2010/0113020 A1* | 5/2010 | Subramanian | H04W 48/18 455/435.2 |
| 2010/0215026 A1* | 8/2010 | Cheng | H04W 36/385 370/388 |

(Continued)

FOREIGN PATENT DOCUMENTS

| | | |
|---|---|---|
| EP | 1460872 A1 | 9/2004 |
| WO | 1002005055418 A1 | 5/2007 |

(Continued)

OTHER PUBLICATIONS

Telefon AB LM Ericsson: "GAN-lu: Selection of the GAN operation mode", 3GPP Draft; GP-071791, 3rd Generation Partnership Project (3GPP), Mobile Competence Centre;vol. TSG GERAN, no. Vancouver; Nov. 8, 2007. XP050019132.

(Continued)

*Primary Examiner* — Sharad Rampuria
*Assistant Examiner* — Farideh Madani
(74) *Attorney, Agent, or Firm* — Leydig, Voit & Mayer, Ltd.

(57) ABSTRACT

A method for enhanced Public Land Mobile Network (PLMN) selection in a cellular mobile network, a User Equipment having information related to a PLMN selection mode, includes: transmitting the information related to the PLMN selection mode to a Registered Public Land Mobile Network (RPLMN) of the User Equipment; and in case that the User Equipment is able to attach to its RPLMN and to at least one other PLMN, performing an attachment of the User Equipment to the other PLMN based on the information related to the PLMN selection mode.

7 Claims, 1 Drawing Sheet

(51) Int. Cl.
*H04W 8/18* (2009.01)
*H04W 60/04* (2009.01)

(56) References Cited

U.S. PATENT DOCUMENTS

| | | | |
|---|---|---|---|
| 2010/0248722 | A1 | 9/2010 | Van Bussel et al. |
| 2010/0268674 | A1* | 10/2010 | Dwyer ............ H04W 36/80066 706/12 |
| 2011/0171925 | A1* | 7/2011 | Faccin ................ H04W 76/007 455/404.1 |
| 2011/0171926 | A1* | 7/2011 | Faccin et al. ............... 455/404.1 |

FOREIGN PATENT DOCUMENTS

| | | | |
|---|---|---|---|
| WO | WO 2009065461 | A | 5/2009 |
| WO | WO 2009105057 | A1 | 8/2009 |

OTHER PUBLICATIONS

"3rd Generation Partnership Project: Technical Specification Group Core Network and Terminals; Non-Access-Stratum (NAS) functions related to Mobile Station (MS) in idle mode (Release 10); 3GPP TS 23.122 V10.1.0 (Sep. 2010)" 3GPP Standard; 3GPP TS 23.122. $3^{rd}$ Generation Partnership Project (3GPP). No. V10.1.0, Sep. 27, 2010, XP050442209.

"3rd Generation Partnership Project; Technical Specification Group Services and Systems Aspects; Service accessibility (Release 10); 3GPP TS 22.011 V10.1.0 (Sep. 2010)" 3GPP Standard; 3GPP TS 22.011. $3^{rd}$ Generation Partnership Project (3GPP). Mobile Competence Centre; No. V10.1.0, Oct. 7, 2010. XP050461873.

* cited by examiner

METHOD AND PROGRAM FOR ENHANCED PLMN SELECTION IN A PUBLIC LAND MOBILE NETWORK

CROSS-REFERENCE TO RELATED APPLICATIONS

This application is a U.S. National Phase application under 35 U.S.C. §371 of International Application No. PCT/EP2011/005342, filed on Oct. 24, 2011, and claims benefit to U.S. Provisional Application No. 61/407,481, filed Oct. 28, 2010, and European Patent Application No. EP 10 014 051.6, filed on Oct. 28, 2010. The International Application was published in English on May 3, 2012 as WO 2012/055523 A1 under PCT Article 21(2).

FIELD

The present invention relates to a method and a program for enhanced PLMN selection in a cellular mobile network. It enables enhanced control in the PLMN selection of the cellular network by taking into account subscriber preferences with regard to the selection of the PLMN which should serve a subscriber, applicable to any cellular mobile networks, like for example: GERAN, UTRAN, LTE/E-UTRAN, LTE-Advanced, cdma2000, WiMAX, WiBro etc, wherein in case of national or international roaming as well as in network sharing scenarios the subscriber preferences are taken into account for selection of PLMNs which should serve the subscriber.

BACKGROUND

In cellular mobile systems like GSM (but also its successors like UMTS or E-UTRAN/LTE) the so-called "PLMN Selection" (PLMN=Public Land Mobile Network) is performed by the user equipment (UE) as defined in [3GPP TS 22.011].

This basic concept of any of these cellular networks is that the distinction between different providers offering mobile services to customers is based on the unique PLMN identity of any of these networks or operators, operating a public land mobile network. These operators can be distinguished by the so-called "PLMN ID". In Germany the PLMN ID of Telekom Deutschland is 262-01 (where 262 is the Mobile Country Code (MCC) of Germany and 01 is the Mobile Network Code (MNC) of Telekom Deutschland). Details about PLMN ID and PLMN selection can be found in [3GPP TS 22.011].

[3GPP TS 22.011] defines two principle modes for PLMN selection:
 Automatic PLMN Selection Mode, and
 Manual PLMN Selection Mode In "automatic PLMN selection mode" the selection of the public land mobile network is automatically performed by the User Equipment. It can be controlled—e.g.—by a data field contained in the SIM or USIM of the terminal equipment. These data files or data fields are either populated by the Home PLMN operator which issued the SIM/USIM card and contain a list of preferred "PLMNs for roaming" (operator controlled PLMN list). The alternative is the provision of the so-called "user controlled PLMN list" which can be edited by the subscriber to define his personal preferences for roaming with certain public land mobile networks.

Alternatively the terminal equipment/User Equipment can be operated in "manual PLMN selection mode": In this mode a new public land mobile network is not selected automatically by the terminal equipment/User Equipment in case the old public land mobile network is lost, but an indication is given to the user on the display that a new PLMN needs to be selected in case of PLMN loss. All details are also defined in [3GPP TS 22.011].

"PLMN selection" is normally only performed in case the old PLMN, typically the Home PLMN of the subscriber is lost. A typical example is when a User Equipment crosses a country border and loses the Home PLMN of the old country. In this case, if the User Equipment is in automatic mode, the User Equipment automatically searches for a new public land mobile network in the new country according to either the "user controlled PLMN list" or the "operator controlled PLMN list". As there are typically international roaming agreements with more than a single operator in the target country, the "operator controlled PLMN list" brings the terminal to the "partner network" in the target country. The preference of the user to select a particular PLMN in a particular country can be controlled by the mentioned "user controlled PLMN list", which takes presence over the "operator controlled PLMN list" according to [3GPP TS 22.011].

A problem in current cellular networks is the service offering in the country border region. In particular, subscribers which live in the area of the country border might wish to avoid international roaming charges when moving out of the Home PLMN into a PLMN of another country as typically the international roaming charges are higher than the ones for the Home PLMN (which might even be included in a flat rate of the subscriber).

In order to avoid a User Equipment in the country border region automatically roaming into a PLMN of another neighbour country, subscribers living in such areas often disable the automatic PLMN selection and use "manual PLMN selection mode".

A negative side effect of such customer behaviour is the fact that the User Equipment remains unreachable unless a new public land mobile network is manually selected by the user or the old (Home) PLMN becomes available again.

Another concept defined by 3GPP for GSM, UMTS and E-UTRAN/LTE enables the network to signal so-called "equivalent PLMNs" (ePLMNs) to a particular User Equipment in order to minimise the service outage which exists also in automatic mode and allows the operator of the source PLMN to control individually to which target PLMN User Equipments should be transferred when crossing a country border. Public land mobile networks which are defined as ePLMNs look to the UE like being the same PLMN and the UE performs a cell reselection between those ePLMN rather than a PLMN selection [see 3GPP TS 23.122].

By using this concept of ePLMNs, the operator can control the User Equipment regardless of the PLMN selection lists contained in the SIM/USIM ("user controlled PLMN list" and "operator controlled PLMN list"). The concept was mainly defined to allow cross-country provision of seamless services between public land mobile network operators belonging to the same group—e.g., to enable a German Telekom Deutschland mobile customer to seamlessly roam into the Austrian T-Mobile AT or the Dutch T-Mobile NL networks. However nowadays the ePLMN concept is also used in various network sharing scenarios within a given country.

A negative side effect of the usage of the ePLMN concept is that the "manual PLMN selection" decision by the customer is overwritten when using this concept along country border to steer international roaming customers into the preferred networks [see 3GPP TS 23.122]. By doing this the roaming charges would affect also those users which by intention disabled the automatic PLMN selection in order to avoid high roaming charges.

SUMMARY

In an embodiment, the present invention provides a method for enhanced Public Land Mobile Network (PLMN) selection in a cellular mobile network. A User Equipment includes information related to a PLMN selection mode. The method includes: transmitting the information related to the PLMN selection mode to a Registered Public Land Mobile Network (RPLMN) of the User Equipment; and in case that the User Equipment is able to attach to its RPLMN and to at least one other PLMN, performing an attachment of the User Equipment to the other PLMN based on the information related to the PLMN selection mode.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
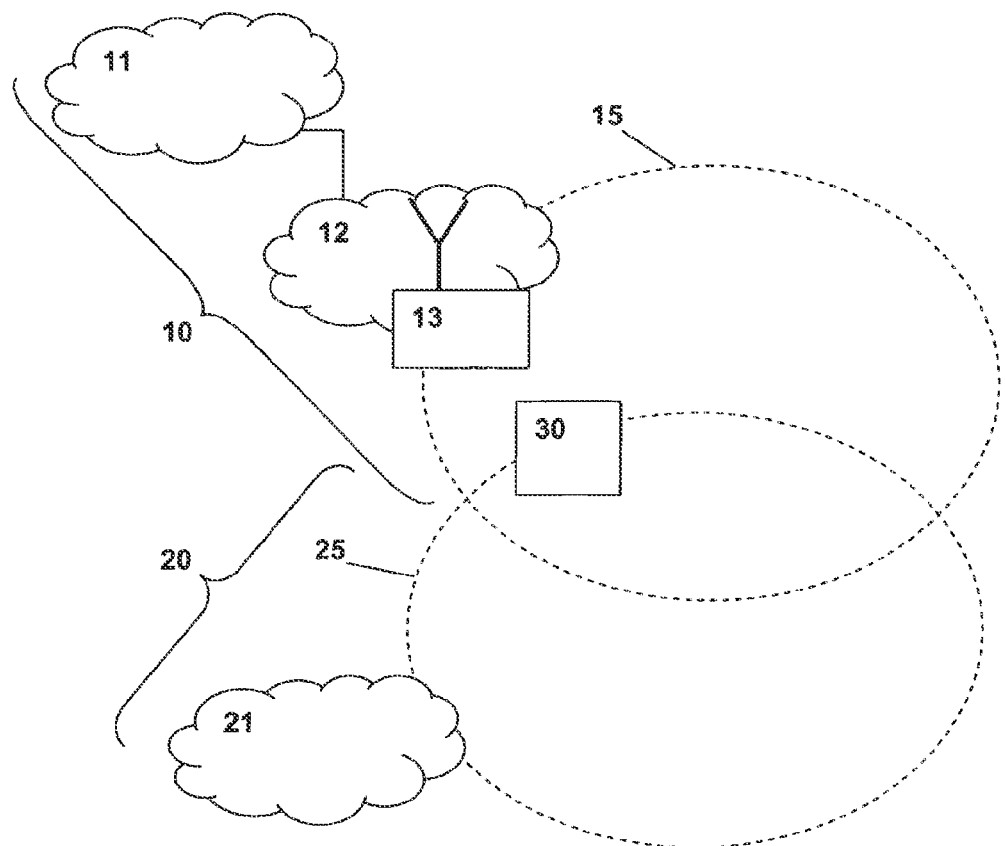
FIG. 1 schematically illustrates a network cell of a public land mobile network in an embodiment.

In order to overcome the limitations of the conventional methods of PLMN selection, embodiments of the present invention provide for avoiding a situation where the preferences of customers are overwritten and thereby enable enhanced radio resource management in cellular public land mobile networks.

Embodiments of the present invention provide a method, a public land mobile network (PLMN), and a program for enhanced PLMN selection in a cellular mobile network, wherein the preferences of customers stored in the User Equipment are used by the public land mobile network to enhance the overall functionality to the customer. In the context of the present invention, the term "PLMN selection" or "enhanced PLMN selection" is used to address the Radio Resource Management or enhanced Radio Resource Management of a User Equipment in a public land mobile network.

In an embodiment, a method is provided for PLMN selection in a cellular mobile network, wherein a User Equipment comprises an information related to a PLMN selection mode, wherein the method comprises the step of transmitting the information related to the PLMN selection mode to a Registered Public Land Mobile Network of the User Equipment, wherein in case that the User Equipment is able to attach to its Registered Public Land Mobile Network and to at least one other public land mobile network, an attachment of the User Equipment to the other public land mobile network is performed dependent on the information related to the PLMN selection mode.

In an embodiment, a method is provided for enhanced Radio Resource Management in a cellular mobile network, wherein a User Equipment is at least potentially able to attach to its Home Public Land Mobile Network and to at least one other public land mobile network, wherein the User Equipment comprises an information related to a PLMN selection mode, wherein the method comprises the step of transmitting the information related to the PLMN selection mode to the Home Public Land Mobile Network of the User Equipment, wherein by using the information related to the PLMN selection mode, the User Equipment attaches to the other public land mobile network.

Thereby, it is advantageously possible according to the present invention, that the user preferences with regard to PLMN selection in cellular networks like for example GERAN, UMTS or E-UTRAN/LTE today are taken into account.

This is achieved by transmitting or indicating the user's selected PLMN selection mode to the current public land mobile network, which in turn can take this information into account for an enhanced PLMN selection.

The Home Public Land Mobile network (HPLMN) is similar to the Registered Public Land Mobile network (RPLMN) in the context of the present invention and therefore the term "Registered Public Land Mobile network" and the abbreviation "RPLMN" is used in the remainder of the text to designate the public land mobile network to which or at which the User Equipment is registered at a considered point in time, i.e. either the User Equipment's Home Public Land Mobile Network in case the User Equipment is presently located in an area where the Home Public Land Mobile Network (HPLMN) is reachable, or a Visited Public Land Mobile Network (VPLMN) in case the Home Public Land Mobile Network (HPLMN) is not reachable (e.g. abroad).

According to embodiments of the present invention, it is preferred that the information related to the PLMN selection mode depends on a subscriber preference with regard to the selection of the public land mobile network which should serve the User Equipment, the information related to the PLMN selection mode being stored in the User Equipment.

It is preferred that the information related to the PLMN selection mode is stored in the subscriber identity module or the Universal Subscriber Identity Module (USIM) within the User Equipment. Thereby, it is advantageously possible to apply the method according to embodiments of the present invention to existing User Equipments without a change of the User Equipment or the User Equipment's behaviour.

According to a preferred embodiment of the present invention, the Home Public Land Mobile Network or the other public land mobile network is a cellular mobile network according to a standard out of:

GERAN,
UTRAN and successors,
LTE/E-UTRAN,
LTE-Advanced and successors,
cdma2000,
WiMAX, and
WiBro.

According to embodiments of the present invention, it is thereby advantageously possible that any cellular radio network or public land mobile network can be used.

According to a further preferred embodiment of the present invention, the information related to the PLMN selection mode indicates that either a manual PLMN selection mode, or
an automatic PLMN selection mode is applicable.

Thereby, it is advantageously also possible to reuse existing sets of information stored in the User Equipment or in the subscriber identity module or Universal Subscriber Identity Module (USIM) of the User Equipment.

Furthermore, it is preferred according to embodiments of the present invention that the method furthermore comprises the step of defining a list of equivalent PLMNs (ePLMN list) dependent on the information related to the PLMN selection mode, wherein the list of equivalent PLMNs is only defined in case that the information related to the PLMN selection mode refers to the automatic PLMN selection mode.

Thereby, it is advantageously possible that, the core network entity which defines the ePLMN list for a particular User Equipment (i.e. the MSC in GSM, the SGSN in GPRS and the MME in E-UTRAN/LTE/LTE-Advanced) avoids to define any ePLMN list for User Equipments which indicated the PLMN selection being set to "manual PLMN selection mode" in order to keep the subscribers preference to not change automatically between PLMNs (in order to avoid roaming charges).

According to still another preferred embodiment of the present invention, the information related to the PLMN selection mode is transmitted from the User Equipment
  to the core network of the Registered Public Land Mobile Network (RPLMN), or
  to the radio access network of the Registered Public Land Mobile Network (RPLMN).

According to still a further preferred embodiment of the present invention, the information related to the PLMN selection mode is transmitted to the core network of the Registered Public Land Mobile Network, and wherein the information related to the PLMN selection mode is transmitted from the core network to the radio access network of the Registered Public Land Mobile Network on transition from an idle mode of the User Equipment to a connected mode of the User Equipment.

Thereby, it is advantageously possible to realize only a limited amount of additional overhead communication between the User Equipment and the public land mobile network.

According to still a further preferred embodiment of the present invention, the information related to the PLMN selection mode is transmitted to the radio access network of the Registered Public Land Mobile Network either
  by using the "Subscriber Profile Identity" (SPID) concept and a single particular code point being defined or multiple code points being defined for the information related to the PLMN selection mode, especially for indicating the manual PLMN selection mode, or
  by using the RRC CONNECTION REQUEST COMPLETE message, preferably by indicating only in case that the manual PLMN selection mode is verified.

Thereby, it is advantageously possible to realize the transmission of the information related to the PLMN selection mode by way of a flexible pattern.

The present invention also relates to a Public Land Mobile Network for enhanced PLMN selection, the public land mobile network serving as a Registered public land mobile network to a User Equipment, wherein the User Equipment comprises an information related to a PLMN selection mode, wherein the Registered Public Land Mobile Network is configured to receive the information related to the PLMN selection mode of the User Equipment, wherein in case that the User Equipment is able to attach to the Registered Public Land Mobile Network and to at least one other public land mobile network, an attachment of the User Equipment to the other public land mobile network is realized dependent on the information related to the PLMN selection mode.

The present invention furthermore also relates to a Registered Public Land Mobile Network serving a User Equipment for enhanced Radio Resource Management, wherein the User Equipment is at least potentially able to attach to the Registered Public Land Mobile Network and to at least one other public land mobile network, wherein the User Equipment comprises an information related to a PLMN selection mode, wherein the Registered Public Land Mobile Network is configured to receive the information related to the PLMN selection mode of the User Equipment, wherein by using the information related to the PLMN selection mode, an attachment of the User Equipment to the other public land mobile network is realized.

According to a preferred embodiment of the present invention, the Registered Public Land Mobile Network is a cellular mobile network according a standard out of:
  GERAN,
  UTRAN and successors,
  LTE/E-UTRAN,
  LTE-Advanced and successors,
  cdma2000,
  WiMAX, and
  WiBro.

The present invention further relates to a program comprising a computer readable program code for controlling a public land mobile network, the computer readable program code being adapted to perform the steps according to embodiments of the method described above.

The present invention further also relates to a computer program product comprising a program.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

According to an embodiment of the present invention, an improved method for enhanced PLMN selection in a public land mobile network is disclosed. FIG. 1 schematically shows an example of a public land mobile network 10 comprising a core network 11, a radio access network 12, and a network cell 15. It is evident to a person skilled in the art that usually, the public land mobile network 10 comprises a plurality of network cells comparable to the network cell 15 depicted in FIG. 1. The network cell 15 comprises, for example, a NodeB/eNodeB 13 or at least a NodeB/eNodeB 13 is assigned to the network cell 15 (which means that one NodeB/eNodeB 13 can also serve a plurality of network cells 15). Usually, a plurality of User Equipments is present within the geographical extension of the network cell 15. For the purpose of describing the present invention, the network cell 15 comprises only one User Equipment 30. Another public land mobile network 20 is overlapping with the Registered Public Land Mobile Network 10, i.e. the User Equipment could have radio access (could reach) the other public land mobile network 20. The other public land mobile network 20 also comprises a network cell, designated by reference sign 25. The other public land mobile network 20 also comprises another core network 21. The decision whether the User Equipment 30 should change from the Registered Public Land Mobile Network 10 to the other public land mobile network 20 is based on information related to the PLMN selection mode. This information is usually stored within the User Equipment 30, usually in the Subscriber Identity Module or Universal Subscriber Identity Module.

According to embodiments of the present invention, the knowledge of the information related to the PLMN selection mode is known to the Registered Public Land Mobile Network 10, and thus allows for a more adapted behaviour of the public land mobile networks 10, 20 regarding the User Equipment 30 and for a better user experience.

In the following, the realization of the enhanced PLMN selection as proposed by embodiments of the present invention is exemplarily explained for a cellular radio network operating according to a specific standard such as the E-UTRAN (LTE) standard, but the invention is also applicable for any other cellular network using any other technology or standard.

Figure 2:
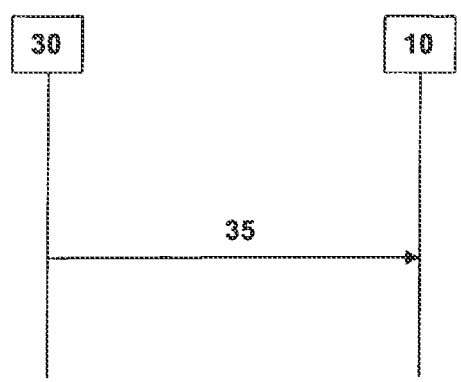
FIG. 2 schematically illustrates the flow diagram for indication or transmission of the information related to the PLMN selection mode of the User Equipment to the network in an embodiment.

In FIG. 2, the flow diagram for indication or transmission of the information 35 related to the PLMN selection mode of the User Equipment 30 to the Registered Public Land Mobile Network 10 according to the present invention is schematically shown. The User Equipment 30 transmits the information 35 related to the PLMN selection mode to the Registered Public Land Mobile Network 10. This can be done either by a direct transmission to the core network 11 of the Registered Public Land Mobile Network 10 or by a direct transmission to the radio access network 12 of the Registered Public Land Mobile Network 10.

According to embodiments of the present invention and in contrast to conventional methods, the information related to the PLMN selection mode is indicated or transmitted by the User Equipment 30 to the network 10 for the realization of an enhanced PLMN selection. The cellular radio network 10 is the Registered Public Land Mobile Network 10 of the User Equipment 30. Usually, this cellular radio network 10 is the Home Public Land Mobile Network 10 of the User Equipment 30 but it could also be a Visited Public Land Mobile Network.

According to the present invention the User Equipment 30 indicates or transmits to the cellular radio network 10 (Registered Public Land Mobile Network) the information related to the PLMN selection mode associated to this User Equipment 30. Preferably, the information related to the PLMN selection mode refers either to the "automatic PLMN selection mode" or to the "manual PLMN selection mode". The information about the PLMN selection mode might also contain information about the PLMN identity (Mobile Country Code (MCC)+Mobile Network Code (MNC)) chosen in manual PLMN selection mode.

As an alternative embodiment of the present invention, the information related to the PLMN selection mode is indicated to the other (or potential destination) Public Land Mobile Network 20 in case, for example, that the previous Registered Public Land Mobile Network 10 did not request the PLMN selection mode information or take the PLMN selection mode information into account. In this case, it is possible that such a Registered Public Land Mobile Network instructs to change the Public Land Mobile Network although the PLMN selection mode (of the User Equipment) has been set to manual PLMN selection. In this case it is possible that the other (or destination) Public Land Mobile Network receives the PLMN selection mode information (from the User Equipment) together with the PLMN identity of the PLMN the User Equipment 30 has chosen in manual PLMN selection. Based on this information received, the other (or destination) Public Land Mobile Network 20 might take this into account for enhanced PLMN selection decisions for the User Equipment, i.e. it is possible that the other (or destination) public land mobile network 20 blocks the registration attempt or handover such that the subscriber preference contained in the information related to the PLMN selection mode is followed as much as possible.

This transmission of information or this indication can be performed in any of the registration procedures according to any of the standard for any of the types of cellular networks. As typically these registration procedures are performed between the User Equipment 30 and the part of the public land mobile network 10 related to the Core Network 11, in an embodiment, information related to the PLMN selection mode ("PLMN selection mode") is indicated together with an information related to the selected PLMN ID ("selected PLMN ID") in the LOCATION AREA UPDATE and ATTACH REQUEST message according to the GERAN or UMTS standard or in the ATTACH or Service Request message according to the E-UTAN/LTE standard.

As an alternative embodiment of the present invention the indication is given in any of the location registration procedures in either
  the LOCATION AREA UPDATE request,
  the ROUTING AREA UPDATE REQUEST according to the GERAN or UMTS standards, or
  the TRACKING AREA UPDATE REQUEST message according to the E-UTRAN/LTE/LTE-advanced standard.

According to another embodiment of the present invention, the core network 11 which received the information 35 related to the PLMN selection mode from the User Equipment 30, does take this information into account when defining equivalent PLMNs for this particular User Equipment 30. Preferably, in an embodiment of the present invention, the core network 11 entity which defines the ePLMN list for a particular User Equipment 30 (i.e. the MSC in GSM, the SGSN in GPRS and the MME in E-UTRAN/LTE/LTE-Advanced) avoids defining any ePLMN list for User Equipments 30 which indicated the PLMN selection being set to "manual PLMN selection mode" in order to keep the subscriber's preference to not change automatically between PLMNs (in order to avoid roaming charges).

According to another embodiment of the present invention, this information about the "PLMN selection mode" of the User Equipment 30 is indicated to the Radio Access Networks (RAN), which controls the mobility of a connected mode User Equipment 30 including any change between different public land mobile networks in contrast to the ePLMN list or the "PLMN selection" which is only applicable in idle mode of the User Equipment 30.

In order to provide the information of the PLMN selection mode of the User Equipment 30 across the network (Registered Public Land Mobile Network 10 or Visited Public Land Mobile Network 20), different alternatives are possible. Either the state transition message which brings the User Equipment 30 from idle to connected mode (i.e. any data packet in GERAN, Service request in UMTS and in E-UTRAN/LTE) can be enhanced to convey the information for a particular User Equipment 30 from the core network to the radio access network, the so-called "subscriber profile ID" (SPID) concept of 3GPP can be used, where a specific codepoint in defined for User Equipments 30 which should be not handed over to a different public land mobile network (as the PLMN selection mode of the UE has been set to "manual PLMN selection mode") or the RRC CONNECTION REQUEST COMPLETE message can be enhanced by the indication of the PLMN selection mode of the User Equipment 30. In the latter case, the User Equipment 30 provides the required information directly to the radio access network.

Further, the radio access network will—in return to the indication of the information related to the PLMN selection mode—take this preference of the User Equipment 30 into account for enhanced PLMN selection decisions and particularly not perform an inter-PLMN Handover for User Equipments 30 which indicated "manual PLMN selection mode".

As an option the radio access network can combine the indication of the UE's PLMN selection mode with other already known information like 'selected PLMN' and 'IMSI' to further detail the PLMN selection towards customer needs. E.g. different mobility handling of different operators sharing the same network with a common PLMN ID or national roaming.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for enhanced Public Land Mobile Network (PLMN) selection in a cellular mobile network, wherein a User Equipment comprises information related to a PLMN selection mode indicating a manner of selecting between PLMNs for the User Equipment, the method comprising:
   transmitting the information related to the PLMN selection mode to a Registered Public Land Mobile Network (RPLMN) of the User Equipment; and
   performing an attachment of the User Equipment to an other PLMN based on the information related to the PLMN selection mode under conditions where the RPLMN and the other PLMN are both available to the User Equipment for attachment, wherein the information related to the PLMN selection mode indicates the manner of selecting between PLMNs for the User Equipment is a manual PLMN selection mode, and wherein the information related to the PLMN selection mode further comprises a Mobile Country Code (MCC) and a Mobile Network Code (MNC) corresponding to the other PLMN;
   wherein the information related to the PLMN selection mode is transmitted to a radio access network of the RPLMN by:
      using a Subscriber Profile Identity (SPID) concept and a single code point being defined or multiple code points being defined for the information related to the PLMN selection mode for indicating, the manual PLMN selection mode: or
      using an RRC CONNECTION REQUEST COMPLETE message by indicating only in case that the manual PLMN selection mode is verified.

2. The method according to claim 1, wherein the information related to the PLMN selection mode depends on a subscriber preference with regard to selection of which public land mobile network should serve the User Equipment, and wherein the information related to the PLMN selection mode is stored in the User Equipment.

3. The method according to claim 1, wherein the information related to the PLMN selection mode is transmitted to the other PLMN.

4. The method according to claim 1, wherein the information related to the PLMN selection mode is transmitted from the User Equipment to a core network of the RPLMN or to a radio access network of the RPLMN.

5. The method according to claim 1, wherein the information related to the PLMN selection mode is transmitted to a core network of the RPLMN and the information related to the PLMN selection mode is transmitted from the core network to a radio access network of the RPLMN on transition from an idle mode of the User Equipment to a connected mode of the User Equipment.

6. A Registered Public Land Mobile Network (RPLMN) for enhanced Public. Land Mobile Network (PLMN) selection, the RPLMN being the RPLMN to a User Equipment, wherein the User Equipment comprises an information related to a PLMN selection mode indicating a manner of selecting between PLMNs for the User Equipment, the RPLMN being configured to:
   receive the information related to the PLMN selection mode of the User Equipment from the User Equipment; and
   facilitate attachment of the User Equipment to an other PLMN based on the information related to the PLMN selection mode under conditions where the RPLMN and the other PLMN are both available to the User Equipment for attachment, wherein the information related to the PLMN selection mode indicates the manner of selecting between PLMNs for the User Equipment is a manual PLMN selection mode, and wherein the information related to the PLMN selection mode further comprises a Mobile Country Code (MCC) and a Mobile Network Code (MNC) corresponding to the other PLMN;
   wherein the information related to the PLMN selection mode is transmitted to a radio access network of the RPLMN by:
      using a Subscriber Profile Identity (SPID) concept and a single code point being defined or multiple code points being defined for the information related to the PLMN selection mode for indicating the manual PLMN selection mode; or
      using an RRC CONNECTION REQUEST COMPLETE message by indicating only in case that the manual PLMN selection mode is verified.

7. A non-transitory computer-readable medium of a User Equipment, the User Equipment comprising information related to a Public Land Mobile Network (PLMN) selection mode indicating a manner of selecting between PLMNs for the User Equipment, having processor-executable instructions for enhanced PLMN selection in a cellular mobile network stored thereon, the instructions, when executed by a processor, causing the following steps to be performed:
   transmitting the information related to the PLMN selection mode to a Registered Public Land Mobile Network (RPLMN) of the User Equipment; and performing an attachment of the User Equipment to an other PLMN based on the information related to the PLMN selection mode under conditions where the RPLMN and the other PLMN are both available to the User Equipment for attachment, wherein the information related to the PLMN selection mode indicates the manner of selecting between PLMNs for the User Equipment is a manual PLMN selection mode, and wherein the information related to the PLMN selection mode further comprises a Mobile Country Code (MCC) and a Mobile Network Code (MNC) corresponding to the other PLMN;

wherein the information related to the PLMN selection mode is transmitted to a radio access network of the RPLMN by:

using Subscriber Profile Identity (SPID) concept and a single code point being defined or multiple code points being defined for the information relate to the PLMN selection mode for indicating the manual PLMN selection mode: or using an RRC CONNECTION REQUEST COMPLETE message by indicating only in case that the manual PLMN selection mode is verified.

* * * * *